Figure 1:
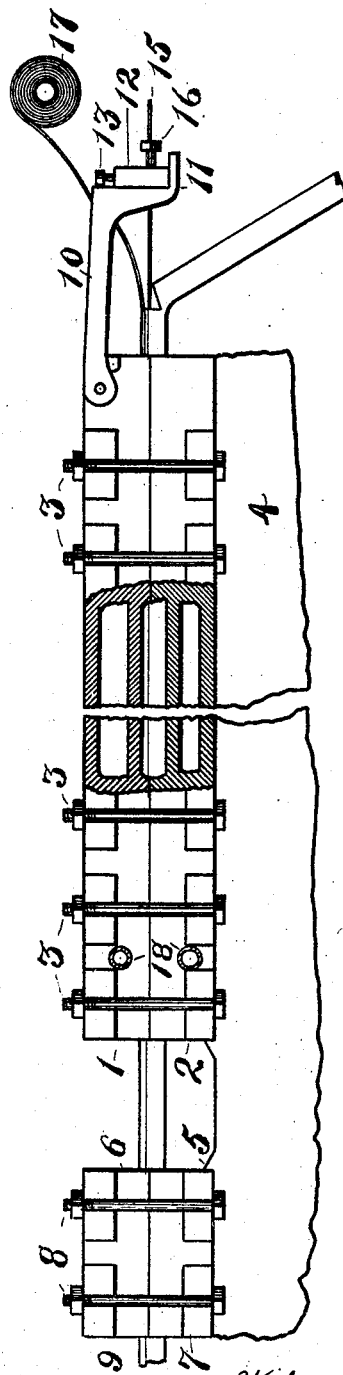

No. 800,182. PATENTED SEPT. 26, 1905.
G. M. STADELMAN.
PROCESS FOR MAKING TIES IN CONTINUOUS LENGTHS.
APPLICATION FILED AUG. 15, 1904.

Witnesses
A. E. Kling.
Kate Schumacher

Inventor
G. M. Stadelman
by C. E. Humphrey, Atty.

UNITED STATES PATENT OFFICE.

GEORGE M. STADELMAN, OF AKRON, OHIO, ASSIGNOR TO THE GOODYEAR TIRE & RUBBER COMPANY, OF AKRON, OHIO, A CORPORATION OF OHIO.

PROCESS FOR MAKING TIRES IN CONTINUOUS LENGTHS.

No. 800,182.     Specification of Letters Patent.     Patented Sept. 26, 1905.

Application filed August 15, 1904. Serial No. 220,830.

*To all whom it may concern:*

Be it known that I, GEORGE M. STADELMAN, a citizen of the United States, residing at Akron, in the county of Summit and State of Ohio, have invented a certain new and useful Improvement in Processes for Making Tires in Continuous Lengths, of which the following is a complete specification.

This invention relates to the manufacture of rubber tires for vehicles. Heretofore in the manufacture of such tires they have usually been molded and vulcanized and supplied to the trade either in a variety of stock lengths adapted to wheels of various diameters, which custom has necessitated the carrying in stock of a large supply by the dealers to meet the various requirements of the purchasers, or they have been supplied to the trade dealers in a continuous length on a reel. In the latter case they are usually manufactured in short lengths and made into a single piece by splicing and uniting them in vulcanizing. This latter method is only successful in tires which do not require circumferential embedded wires to fasten them to the wheel, and experience has demonstrated that the joint between the short sections has proven a source of complaint against their use and sale, because the tread or wear-resisting portion of the tire is severed, rendering it liable to become separated in use and unfit for further service, and in manufacturing continuous-length tires having embedded longitudinal wires the coring, molding, and placing of suitable openings therein has not been as yet attended with signal success, due in a large measure to the fact that the core-wires must be under a tension during the vulcanizing process.

My invention has for its primary object the obviating of these objectionable features, and this object it accomplishes through a novel method or process of manufacture of this class of goods whereby they are enabled to be supplied to the dealers in continuous lengths with longitudinal openings formed therein of proper size and in proper place to receive the binding-wires conveniently put up in coil form on reels or like devices from which suitable lengths may be cut for the purchaser without any waste to the dealer.

Another and equally important object is to avoid any cutting or severance of the tread or wear-resisting portion of the tire necessarily attendant on splicing a series of short lengths together, and a further object is to sustain the core wires or mandrels employed in forming the openings in the tire-body during the act of vulcanization that they will be under a proper degree of tension sufficient to insure their accuracy of position.

Briefly stated, the manufacture of such tires in continuous lengths with longitudinal openings molded therein is carried out by this present invention through a series of steps or operations which consist, first, in forcing from a tube or forming-machine having a suitably-shaped die a continuous tire of unvulcanized rubber with the tire-receiving openings therein, then after covering the base portion with a fabric vulcanizing a short portion of the advance end of the tire in a mold-cavity with the tread portion downward, then after releasing this end carrying it forward and inserting the vulcanized end in a clamp beyond the vulcanizer and placing the next succeeding portion of the tire in the mold, then making a shallow cut in the base of the unvulcanized protruding portion of the tire, bending down the balance of the tire, using the unsevered portion as a hinge, inserting core wires or mandrels through the openings in the tire from the cut in the protruding end to the previously-vulcanized end, then clamping the vulcanized end of the tire onto the wires and placing the opposite ends of the wires in suitable clamps at the other end of the vulcanizer and after clamping them drawing the wires taut by mechanism connected with the second clamp, then after vulcanizing the portion of the tire in the mold-cavity and releasing the clamps and mold-section withdrawing the wires and advancing the unvulcanized portion of the tire forward in the mold as far as possible and still cause the cut to be wholly inclosed in the mold at its next closing, then cutting the protruding portion, as before described, and after inserting the core-wires and clamping them the portion of the tire in the mold-cavity is vulcanized, which effectually closes the previous cut, leaving the tread or wear-resisting portion of the tire unimpaired.

In order that this invention may be fully and clearly understood, there is illustrated in the accompanying drawings one out of a great number and variety of means for carrying the same into effect, the means herein shown consisting of a vulcanizing-mold into which is introduced a heating medium of practically a form and construction such as is in common use for manufacturing short-length tires with the necessary additions thereto for adapting it to the carrying out of the present invention to secure the best results, and referring thereto—

Figure 4:
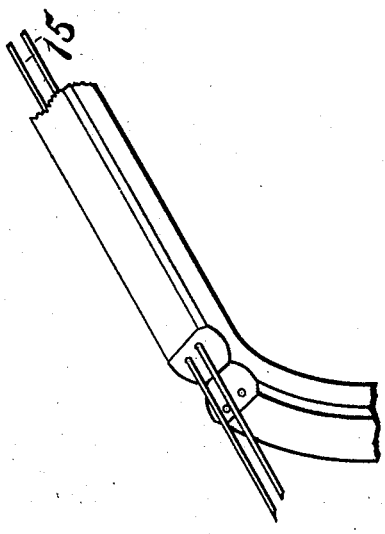
Figure 3:
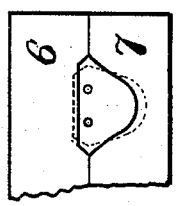
Figure 2:
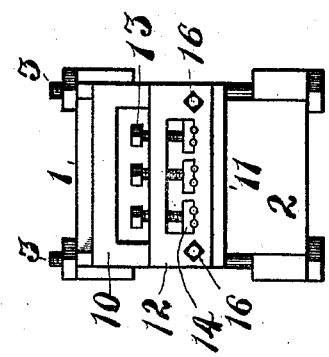

Figure 1 is a side elevation of the entire device; Fig. 2, an end elevation from the right of Fig. 1; Fig. 3, an end view of a portion of the tire-clamp, and Fig. 4 a perspective view of a tire cut to receive the core wires or mandrels.

Describing first briefly the particular apparatus herein shown as constituting one instrumentality through which my invention may be carried out in practice, 1 and 2 designate the upper and lower sections, respectively, of a vulcanizing-mold of that type wherein the mold members are cored for the reception of the heating medium necessary to effect the vulcanizing process, and the heating medium, which is usually steam, is introduced to the interior of the core-openings by any suitable pipes or hose connections 18 from any supply which the location of the apparatus may require. These mold-sections are fastened or held together in a variety of ways; but a common method is by bolts 3, as shown. The lower section 2 of the mold may rest on a table 4, as shown, or on any suitable support.

To the left of the vulcanizer-sections 1 and 2 and separated therefrom a suitable distance is a tire-clamp 9, likewise mounted on the table 4, if preferred, and held from nearer approach to the vulcanizer-sections by a ridge or shoulder 5 or by any other desired means. This tire-clamp 9 consists of two sections 6 and 7, separating on a line with the plane of the line of separation of the vulcanizer-sections, and the halves of the tire-clamp may be held together by bolts 8, as shown, or by a hydraulic press or any other instrumentality capable of accomplishing an equivalent result. The openings through this tire-clamp 9 have a general shape of a tire-section, but are vertically shallower and longitudinally wider to enable them to compress the tire onto the core-wires and allow sidewise expansion of the displaced rubber, thereby insuring a safe firm hold on the core wires or mandrels.

On the opposite end of the vulcanizer-section 1 from the tire-clamp 9 is a pivoted bracket 10, with a horizontal shelf 11, on which is sustained a multiple wire-clamp 12. This wire-clamp 12 consists of a frame surrounding a central opening into which pass set-screws 13, having on their lower ends jaws 14, properly grooved to receive and press the core-wires against the lower bar of the frame of the wire-clamp, which is also correspondingly grooved. In either side of the wire-clamp 12 are set-screws 16, arranged to bear against the sides of the vertical portion of bracket 10, which on being properly manipulated cause the wire-clamp 12 to be forced away from the bracket 10, thus exerting on the core-wires a desired tension. For convenience of handling a spool or reel of fabric 17 is supported or suspended at a convenient point near the bracket 10, from which a strip of fabric is led to and applied on the base portion of the unvulcanized tire while being placed in the mold-cavity.

If at any time the action of the tire-clamp 9 should tend to distort the position of the core wires or mandrels 15 at that end, the passage of these wires through the vulcanized unclamped portion of the tire between the tire-clamp 9 and the vulcanizer-sections 1 and 2 will in all cases correct such deviation and cause them to extend through the molds properly and firmly located.

The tire as it emerges from the tire-clamp 9 and made in accordance with the invention hereinbefore described is reeled up or wound into convenient coils and shipped to the dealer, the great advantage thereof being that tires of varying lengths can readily be cut, thus eliminating all waste and obviating the necessity of the dealer carrying on hand a great variety of stock-length tires.

While the hereinbefore-described mechanism is well adapted for carrying out the invention, it will be understood that my novel method of tire-making is capable of being practiced by the use of any other form of vulcanizer which will permit the advancement longitudinally therethrough successively of the various portions of the tire, and various forms of clamps may be employed so long as they are capable of accomplishing equally efficient results, and the method of cutting the tire on its base portion may be changed to a longitudinal slitting instead of the transverse cut shown without in any way departing from the scope of my invention, the novelty of which resides in a series of acts or operations performed in a certain order upon the rubber-stock in connection with the vulcanization thereof whereby there is produced a continuous and uniform length of tire wholly free from splices with their attendant features of weakness and roughness and provided throughout the entire length with accurately-placed openings for the reception of the binding-wires.

I claim—

1. As a step in the manufacture of rubber tire by successively vulcanizing mandrel-containing portions of a continuous length of the tire-stock, that of incising said stock to expose the mandrel-openings therein without impairing the continuity of the tread portion.

2. The improvement in the manufacture of rubber tires, which consists in vulcanizing, in succession, portions of the prepared tire-stock, incising said stock to expose the mandel opening or openings without impairing the continuity of the tread portion, and inserting the mandrel or mandrels into said opening or openings.

3. The improvement in the manufacture of rubber tires, which consists in forming the vulcanizable tire-stock in a continuous length, vulcanizing portions of said stock in succession, incising said stock to expose the mandrel-openings without impairing the continuity of the tread portion, and inserting mandrels into said openings.

4. The improvement in the manufacture of rubber tires, which consists in vulcanizing in succession, portions of a continuous length of the prepared tire-stock, incising said stock at intervals to expose the mandrel-openings without impairing the continuity of the tread portion, and inserting mandrels into said openings preparatory to each vulcanizing operation.

5. The improvement in the manufacture of rubber tires, which consists in vulcanizing unsevered portions of the tire in succession, providing one or more incisions through the tire extending short of its entire thickness to expose the core-wire opening or openings, and inserting therein the core-wires or mandrels through said incisions.

6. The improvement in the manufacture of rubber tires, which consists in forming the tire in a continuous length, successively vulcanizing portions thereof in a mold, making an incision in the tire, inserting a mandrel into a portion of the tire through said incision before each vulcanizing operation, and removing the mandrel after each vulcanizing operation.

7. That improvement in the manufacture of rubber tires, which consists in forming the tire in a continuous length, making an incision in the tire, inserting a mandrel into a portion of the tire through said incision, vulcanizing the portion of the tire containing the mandrel, and reuniting the severed portions adjacent the incision during a succeeding vulcanizing operation.

8. That improvement in the manufacture of rubber tires, which consists in forming the tire in a continuous length, making an incision in the tire, inserting a mandrel into a portion of the tire through said incision, vulcanizing the portion of the tire containing the mandrel and closing said incision during a succeeding vulcanizing operation.

9. That improvement in the manufacture of rubber tires, which consists in forming the tire in a continuous length, making an incision in the tire, introducing a mandrel into a portion of the tire, vulcanizing the portion of the tire containing the mandrel, and removing the mandrel and repeating such operation until the entire length of tire has been vulcanized.

10. That improvement in the manufacture of rubber tires, which consists in forming the tire in a continuous length, incising said tire sufficiently to expose the core-openings therein, introducing a mandrel into a portion of the tire through said incision, vulcanizing the portion of stock containing said mandrel, and closing said incision during the next succeeding vulcanizing operation.

In testimony that I claim the above I hereunto set my hand in the presence of two subscribing witnesses.

GEORGE M. STADELMAN.

Witnesses:
C. E. HUMPHREY,
KATE SCHUMACHER.